United States Patent [19]

Heiser

[11] 4,030,522

[45] June 21, 1977

[54] HYDRAULIC CONTROL VALVE ARRANGEMENT

[75] Inventor: Joachim Heiser, Stuttgart, Germany

[73] Assignee: Robert Bosch G.m.b.H., Stuttgart, Germany

[22] Filed: Apr. 18, 1975

[21] Appl. No.: 569,173

[30] Foreign Application Priority Data

Apr. 26, 1974 Germany .......................... 2420242

[52] U.S. Cl. ............................ 137/596.13; 91/451; 137/469; 137/514.5

[51] Int. Cl.[2] .................. F15B 13/042; F16K 11/00

[58] Field of Search ............................ 91/451, 468; 137/596.13, 469, 514.5

[56] References Cited

UNITED STATES PATENTS

| | | | |
|---|---|---|---|
| 2,339,101 | 1/1944 | Parker | 137/514.5 |
| 2,539,361 | 1/1951 | Cannon | 91/451 X |
| 3,199,532 | 8/1965 | Trick | 137/469 |
| 3,266,251 | 8/1966 | Kacek | 137/469 X |
| 3,610,276 | 10/1971 | Seelman et al. | 137/514.5 X |
| 3,677,286 | 7/1972 | Wolfson | 137/469 |
| 3,847,180 | 11/1974 | Kroth et al. | 91/451 X |
| 3,882,896 | 5/1975 | Budzich | 91/451 X |

*Primary Examiner*—Irwin C. Cohen
*Attorney, Agent, or Firm*—Michael J. Striker

[57] ABSTRACT

Hydraulic control valve arrangement for controlling the amount of pressure fluid flowing to a consumer, in which the valve member of a first valve, which selectively controls flow of pressure fluid to at least one consumer or from the latter to a return passage, forms a variable throttle between the pressure fluid inlet passage and a consumer passage connected to the consumer, in which the throttle causes a pressure difference, and in which the pressure difference may be maintained substantially constant by a bypass passage between the inlet passage and the return passage in which a second valve member is arranged which is biased by a spring to a closed position and by the pressure difference produced by the variable throttle to an open position.

7 Claims, 3 Drawing Figures

HYDRAULIC CONTROL VALVE ARRANGEMENT

BACKGROUND OF THE INVENTION

The present invention relates to a hydraulic control valve arrangement for controlling the amount of pressure fluid flowing to at least one consumer, in which the valve member of a first valve selectively controls the flow of pressure fluid to at least one consumer or from the latter to a return passage and forms a variable throttle between a pressure fluid inlet passage and the consumer passage connected to the consumer, in which the throttle causes a pressure difference, and in which the pressure difference or pressure drop may be maintained substantially constant by a bypass passage between the inlet passage and the return passage in which a second valve member is arranged which is biased by a spring to a closed position and by the aforementioned pressure difference produced by the variable throttle to an open position.

In a known hydraulic control arrangement of the aforementioned kind, the second valve member is biased by a spring to the closed position in which the pretension of the spring is adjustable by a hydraulically movable piston. In this way it is possible to obtain a very small circulation pressure when the first valve is closed and in which by lacking load pressure the aforementioned piston assumes an end position in which the pretension of the spring reaches its minimum value. On the other hand, when the pretension of the spring at prevailing load pressure increases, the hydraulic control valve arrangement can be used for considerably higher flow speeds. This known arrangement has, however, the disadvantage that the transition from the lower to the higher pressure drop will not occur in a gradual manner, but abruptly. In addition, this known arrangement is relatively complicated since it needs for tensioning the spring an additional hydraulically actuated piston.

SUMMARY OF THE INVENTION

It is an object of the present invention to provide for a hydraulic control arrangement of the aforementioned kind which avoids the above mentioned disadvantages of known arrangements.

It is a further object of the present invention to provide a hydraulic control arrangement of the aforementioned kind which has improved control characteristics.

It is an additional object of the present invention to provide a hydraulic control arrangement of the aforementioned kind which is simple in construction so that it can be built at reasonable cost and will stand up properly under extended use.

With these, and other objects in view, which will become apparent as the description proceeds, the hydraulic control valve arrangement according to the present invention for controlling the amount of flow of pressure fluid to at least one consumer mainly comprises first valve means having a first valve member movable between a neutral position preventing flow of fluid from an inlet passage connected to a source of hydraulic pressure fluid to the consumer and from the latter to a return passage, and a plurality of active positions for permitting flow from the inlet passage to the consumer, respectively flow from the consumer to the return passage, in which the first valve member forms a first throttle between the inlet passage and the consumer passage connected to the consumer which varies as a function of the movement of the first valve member away from its neutral position, a bypass passage between the inlet passage and the return passage, a second valve member in the bypass passage movable between an open and a closed position and biased to the open position by the pressure difference produced by the first throttle and by spring means to the closed position, a second throttle formed in the bypass passage, and pressure faces on the second valve member arranged in such a manner that the pressure difference produced by the second throttle acts on the pressure faces of the second valve member to bias the latter in a direction opposite to the force produced by the spring means.

In this arrangement, the transition from the low pressure drop produced by the circulating fluid when the first valve member is in a neutral position to the high pressure drop produced when the first valve member is in a fully open position and a maximum pressure fluid flow occurs to the consumer, will proceed in a steady manner without sudden changes. The pressure fluid stream over the first valve member to the consumer is thereby dependent in a nonlinear manner on the open flow passage produced by the first valve member so that a flow characteristic similar to a fine control is obtained. In addition, the hydraulic control arrangement of the present invention is relatively simple and especially compact.

The novel features which are considered as characteristic for the invention are set forth in particular in the appended claims. The invention itself, however, both as to its construction adn its method of operation, together with additional objects and advantages thereof, will be best understood from the following description of specific embodiments when read in connection with the accompanying drawing.

DESCRIPTION OF THE PREFERRED EMBODIMENTS

Figure 1:
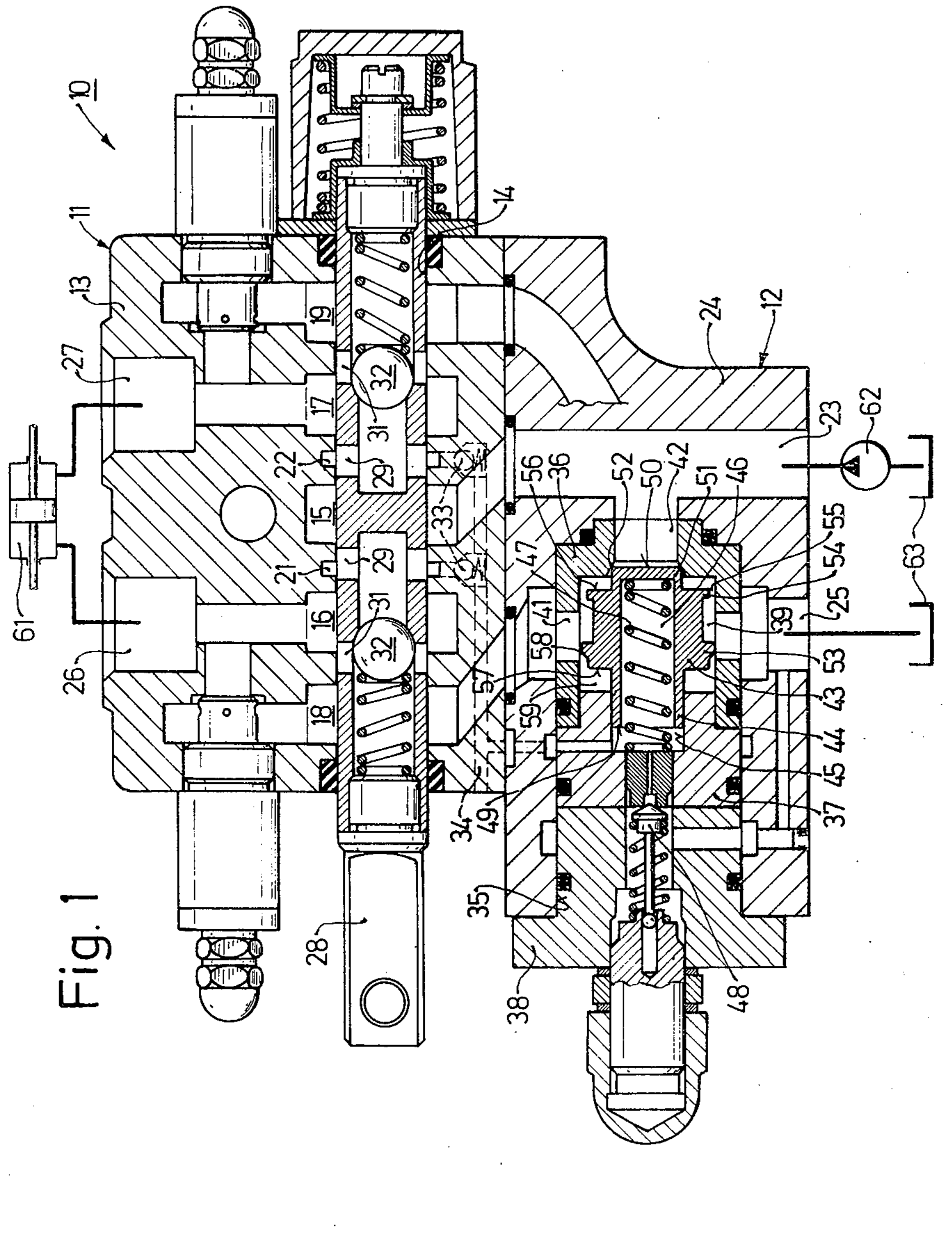
FIG. 1 is a longitudinal cross section through the control valve arrangement according to the present invention.

The control valve arrangement 10 shown in cross section in FIG. 1 comprises a first unit 11 and a second unit 12. The first unit 11 includes a housing 13 provided with a longitudinal bore 14 passing therethrough. The bore 14 has a plurality axially spaced annular enlargements which respectively form an inlet chamber 15, a first and a second consumer chamber 16, respectively 17, a first and a second return passage chamber 18, respectively 19, and a first and second flow control chamber 21, respectively 22. The inlet chamber 15 is connected with an inlet passage 23 provided in the housing 24 of the second unit 12. In a corresponding manner, the return chambers 18 and 19 are connected with a return passage 25, whereas the consumer chambers 16 and 17 are connected to connecting passages or connecting sockets 26 and 27 in the housing 13. A hollow first valve member 28 is fluid-tightly guided in the longtudinal bore 14 for reciprocation and the first valve member 28 is in the usual manner formed with first and second control openings 29 and 31 and in its interior with a pair of check valves consitituted by balls 32 pressed by springs against valve seats formed in the interior of the valve member 28 between the first and the second control openings 29 and 31. The first control openings 29 form together with the housing 13 adjustable throttles which respectively are located at connections from the inlet passage 23 to the connecting sockets 26, respectively 27. The control chambers 21 and 22 are respectively connected over second check valve 33 with a control channel or control passage 34.

The housing 24 of the second unit 12 abutting with an upper end face against a bottom face of the housing 13 and fixedly connected thereto in any known manner, not shown in the drawing, is provided with a blind bore 35 which intersects the return passage 25, and in which a bushing 36 and a spacer member 37 are arranged, while the outer or left end, as viewed in FIG. 1, of the blind bore 35 is closed by a closure plug 38. The bushing 36 together with the spacer member 37 defines a chamber 39 which is connected by radial bores 41 in the bushing 36 with the return passage 25 and by an axial bore 42 with the inlet passage 23. The axial bore 42 together with the chamber 39 and the lower one of the radial bores 41 forms therefore a bypass passage between the inlet passage 23 and the return passage 25. A second hollow valve member 43, closed at one end, is closely guided at its open end portion 44 in a bore 45 of the spacer member 37. The thus formed control chamber 46 is connected with the control channel or passage 34. The control chamber 46 communicates with a pressure limiting valve 48 and a compression spring 47 is arranged in the interior of the valve member 43 abutting with opposite ends against the closed end of the valve member and a plug located in a bore of the spacer member 37 providing through a bore therethrough communication between the chamber 46 and the pressure limiting valve 48. The second valve member 43 is provided at its right end, as viewed in FIG. 1, with a control edge 52 which, in the position shown in FIG. 1, engages the corresponding valve seat formed in the bore 42. It will be noted that the face portions of the valve member 43 which are acted upon by the pressure in the control chamber 46, that is the annular end face 49 and the inner face at the end wall of the valve member 43 have the same size as the right end face 50 at the closed end of the valve member about which the control edge 52 is provided. The valve member 43 is further provided in the chamber 39 with a piston section 53 having a radially outwardly projecting collar 54, the outer peripheral surface of which forms with the inner surface of the bushing 36 a second throttle 55 located between the inlet passage 23 and the return passage 25 and in direction of any fluid flow passing through the bypass passage downstream of the control edge 52. The piston section 53 forms at opposite end faces second pressure faces 56 and 57 of equal size on which the pressure difference produced by the second throttle 55 may act. The piston section 53 is further provided, axially spaced from the collar 54, with a damping collar 58 which defines in the chamber 39 a damping chamber 59 and which controls the connection between the damping chamber 59 and the return passage 25.

The connecting sockets 26 and 27 are connected to a consumer 61, here shown as a double acting cylinder and piston means, the inlet passage 23 is supplied with pressure fluid from a pump 62 connected thereto, whereas the return passage 25 is connected to a reservoir 63.

The above described control valve arrangement will operate as follows:

In the neutral position of the first valve member 28, shown in FIG. 1, the piston of the consumer 61 will be hydraulically blocked. The control channel 34 and the control chamber 46 are relieved through the small clearance between the end portion 44 of the second valve member and the bore 45, which clearance acts in a known manner as a throttle, to the return passage 25. The fluid stream pumped by the pump 62 flows from the inlet passage 23 through the bore 42 and displaces the second valve member 43 from the closed position shown in FIG. 1 so that the fluid stream will pass through the chamber 39 to the return passage 25. The thereby resulting circulation pressure depends not only on the fluid pressure acting on the end face 50 of the second valve member 43 and the force produced by the spring 47 but also on the pressure difference produced by the second throttle 55 which acts on the faces 56 and 57 of the second valve member 43 in opposition to the force produced by the spring 47. The forces acting on the second valve member 43 are therefore:

$$F_P = F_F + F_L - F_D,$$

in which $F_P$ is the force produced by the fluid pressure in the bore 42 acting on the end face 50, $F_F$ is the force produced by the spring 47, $F_L$ is the force produced by the load pressure in the control chamber 46 and $F_D$ is the force difference produced by the second throttle 55. The latter force is substantially equal to the product of a constant times the square value of the amount of pressure fluid flowing through the bypass passage. During absence of a load pressure, a neutral circulation pressure is obtained which is smaller than the force produced by the spring 47.

If the first valve member 28 is now moved slightly from the neutral position shown, then most of the pressure fluid pumped by the pump will flow over the second valve member 43 to the return passsage 25, whereas only a very small part of the fluid stream will flow to the consumer 61. The thereby resulting pressure difference produced at one of the control openings 29 of the first valve member, which acts as a first throttle, will be regulated to a constant value independent of the prevailing load. For this purpose, the prevailing load pressure is transmitted over one of the flow control chambers 21, 22 and the control channel 34 into the control chamber 46 at which it acts on the first face 49 of the second member 43. Due to the smaller amount of pressure fluid which flows over the second valve member 43, the force $F_D$ will drop slightly as compared to the conditions prevailing when the first valve member 28 is in its neutral position. The pressure difference produced at the slightly opened control openings 29 of the first valve member 28 will correspondingly rise but not yet reach its maximum value.

If the valve member 28 is now moved to the fully open position so that the control openings 29 thereof will be opened to the maximum cross section, nearly the whole amount pumped by the pump 62 will pass through the valve member 28 to the consumer 61 and only a very small partial fluid stream will pass over the second valve member 43 to the return passage 25 so that the control edge 52 will be very close to its valve seat formed in the bushing 36. Due to this small partial stream, the second throttle 55 will produce only a very small pressure difference. The pressure gradient available now at the first valve member 28 for the maximum fluid stream to the consumer 61 will result from the force produced by the spring 47 and will now reach its maximum value.

Figure 2:
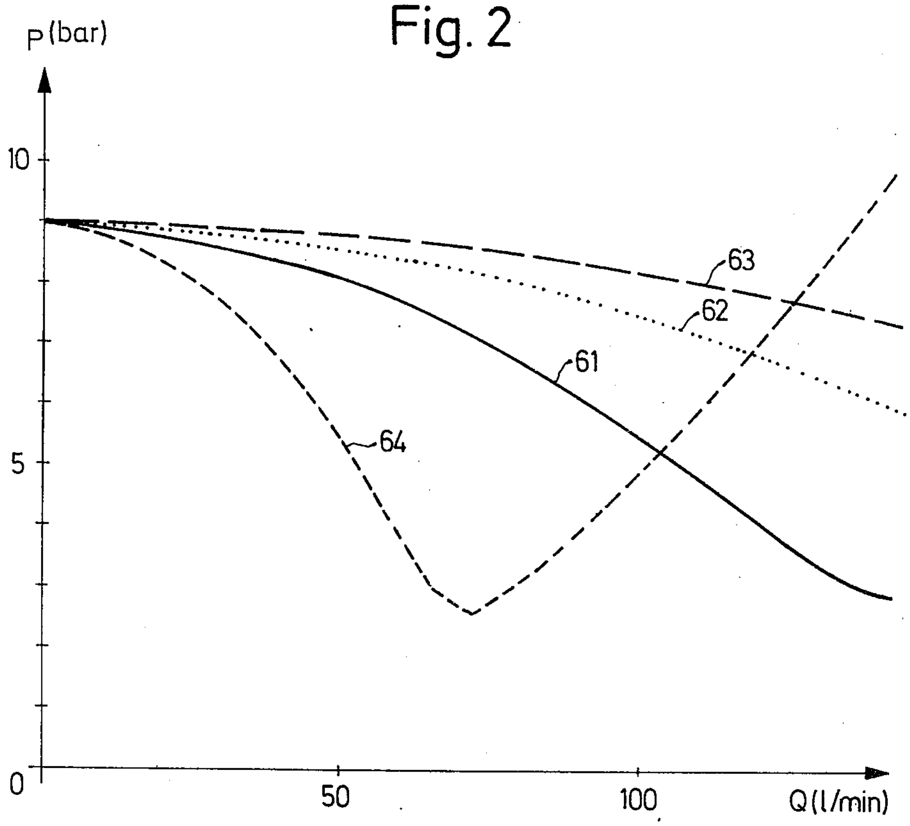
FIG. 2 is a diagram showing the variation of the pressure P acting on the second valve member in dependence on the amount of pressure fluid flow passing through the arrangement.

As shown in FIG. 2, a gradual transition for the available pressure gradient is thus produced between the above described extreme positions. The second valve member 43 with its second throttle 55 can be constructed in such a manner that a suitable descending characteristic curve is produced. Thus, the characteristic curve 61 shows that by a maximum flow of pressure fluid Q over the second valve member 43 the circulation pressure when the first valve member is in its neutral position will be about 3 bars, whereas when the first valve member 28 is moved to its fully open position, so that the maximum amount of pressure fluid will flow to the consumer 61, a pressure difference of nearly 9 bars will be available. The characteristic curves 62 and 63 show the relationship if the second throttle is constructed with a larger cross section, whereas reducing of the cross section of the second throttle leads to a characteristic curve 64. By selecting the cross section of the second throttle 65 it is therefore possible to influence the shape of the characteristic curves in a desired manner.

Figure 3:
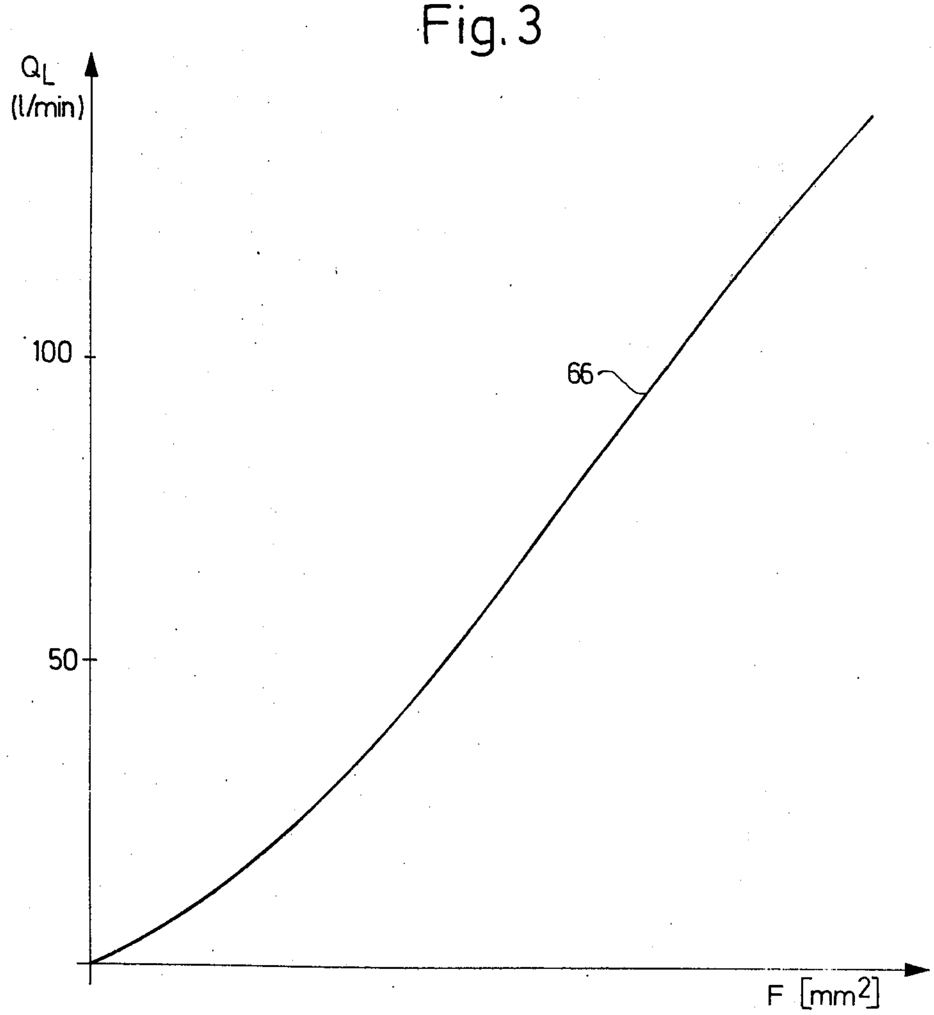
FIG. 3 is a diagram showing the amount of pressure fluid flow Q flowing to the consumer in dependence on the cross section F of the flow passage in the various active positions of the first valve member.

The characteristic curve 66 shown in FIG. 3 illustrates the variation of the amount of pressure fluid $Q_L$ flowing to the consumer as a function of the open cross sections of the control openings 29 in the first valve member 28 during movement of the latter from the neutral to any of the active positions. As can be seen from FIG. 3, this variation will occur in a nonlinear manner similar to that produced by a precision control valve. The control characteristics of the control valve arrangement according to the present invention are therefore considerably improved as compared with known control valve arrangements with load compensation.

It will be understood that each of the elements described above, or two or more together, may also find a useful application in other types of hydraulic control valve arrangements differing from the types described above.

While the invention has been illustrated and described as embodied in a hydraulic control valve arrangement for controlling the amount of flow of pressure fluid to a consumer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Hydraulic control valve arrangement for controlling flow of fluid to at least one fluid actuated consumer device, comprising housing means provided with inlet passage means connected to a source of hydraulic pressure fluid, consumer passage means connected to a consumer device, return passage means connected to a reservoir, and a bore intersecting said passage means; a first valve member movable in said bore between a neutral position preventing flow of fluid from said inlet passage means to the consumer device and from the latter to said return passage means, and a plurality of active positions for permitting flow from said inlet passage means to the consumer device, respectively flow from the latter to said return passage means, said first valve member forming a first throttle between said inlet passage means and the consumer passage means which varies as a function of the movement of said first valve member away from its neutral position; a bypass passage in said housing means between said inlet passage means and said return passage means, said bypass passage including a valve seat and a chamber downstream of said valve seat; a second valve member in said bypass passage movable between a closed position engaging said valve seat and an open position, said valve member having a pair of opposite first pressure faces, one of which being subjected to the fluid pressure in said inlet passage means and said second valve member including a piston portion having a pair of opposite ends in said chamber between said first pressure faces and having a diameter greater than the remainder of said second valve member, a first collar on one of said opposite ends of said piston portions which is adjacent said valve seat and having an outer peripheral surface closely adjacent to a peripheral surface defining said chamber and forming therewith a second throttle, and a damping collar on said piston portion axially spaced from said first collar and forming in said chamber to one side of said damping collar a damping chamber; control passage means communicating with said bore downstream of said first throttle and directing fluid pressure to the other of said first pressure faces so that said second valve member is biased by the pressure difference produced by said first throttle to said open position; spring means biasing said second valve member to said closed position; said opposite ends of said piston portions forming together with said first and second damping collars, respectively, a pair of second pressure faces, one of which is located downstream of said second throttle so that the pressure difference produced by said second throttle acts on said second pair of pressure faces to bias said second valve member in a direction opposite to the force produced by said spring means.

2. Hydraulic control valve arrangement as defined in claim 1, said second valve member having a control edge engaging said valve seat in said closed position of said second valve member, said second throttle being arranged between said control edge and said return passage means.

3. Hydraulic control valve arrangement as defined in claim 1, wherein said chamber communicates at one end thereof through an axial bore of a diameter smaller than that of said chamber with said inlet passage means and with radial bores with said return passage means, said valve seat being formed at the junction of said axial bore with said chamber.

4. Hydraulic control valve arrangement as defined in claim 3, and including a bore portion coaxial with said axial bore and extending into said housing means from the other end of said chamber, said second valve member having opposite said control edge a portion closely guided in said bore portion.

5. Hydraulic control valve arrangement as defined in claim 4, wherein said control passage means provide communication between said bore in which said first valve member is arranged, downstream of said first throttle, and the end of said bore portion distant from said other end of said chamber.

6. Hydraulic control valve arrangement as defined in claim 4, wherein said second valve member is formed with an axial bore having an open end located in said bore portion and a closed end provided with said control edge, said spring means comprising a compression spring located in said axial bore of said second valve member.

7. Hydraulic control valve arrangement as defined in claim 1, wherein said spring means comprises a coil compression spring abutting with one end against said second valve member and with the other end against a fixed abutment.

* * * * *